April 26, 1949.
H. NUTT ET AL
2,468,685
ANTIRATTLER SPRING AND LEVER SYSTEM
FOR CENTRIFUGAL CLUTCHES
Filed Oct. 30, 1944
3 Sheets-Sheet 1
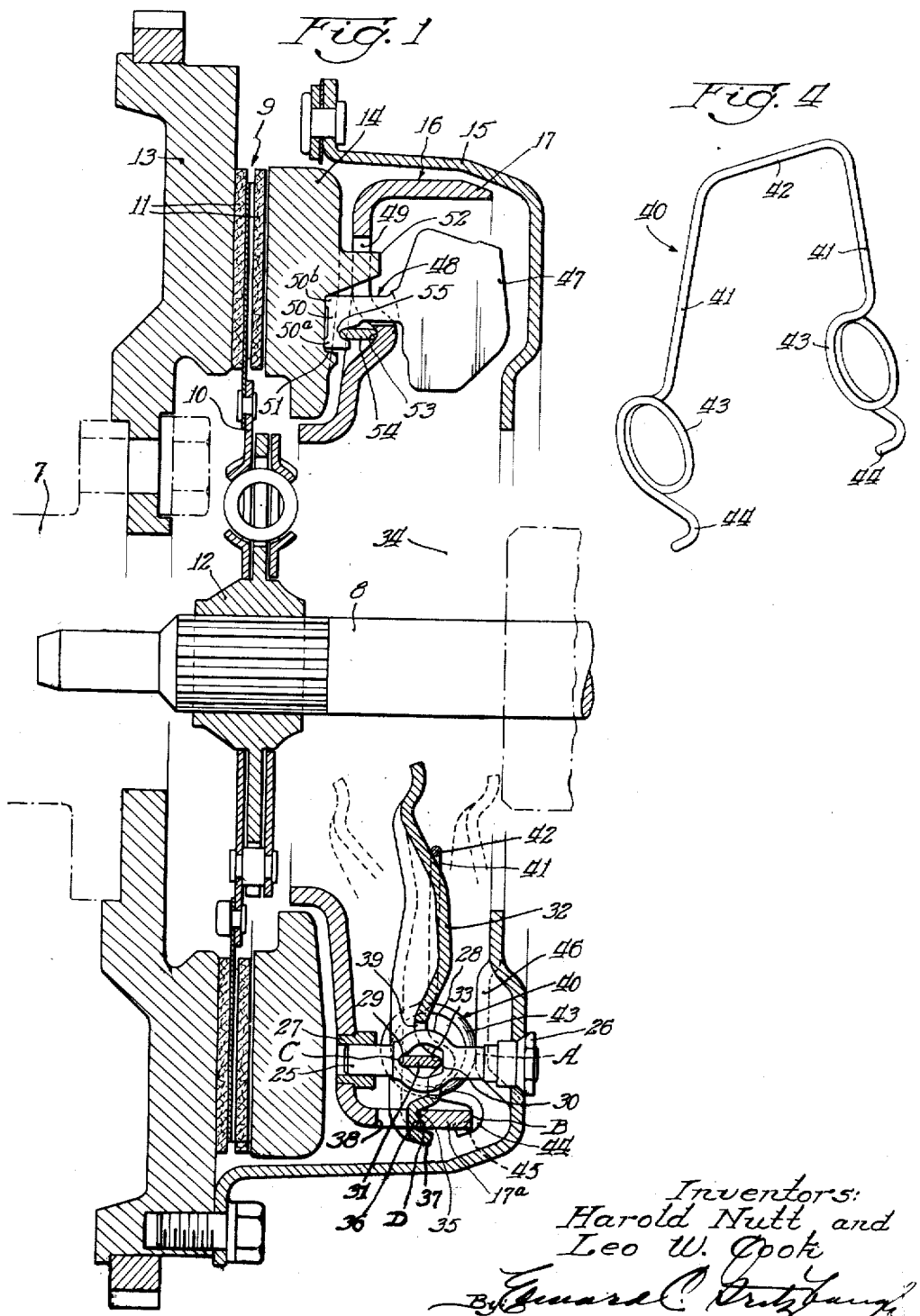
Inventors:
Harold Nutt and
Leo W. Cook
By Edward C. Fritzlaug
Atty.

April 26, 1949.   H. NUTT ET AL   2,468,685
ANTIRATTLER SPRING AND LEVER SYSTEM
FOR CENTRIFUGAL CLUTCHES
Filed Oct. 30, 1944
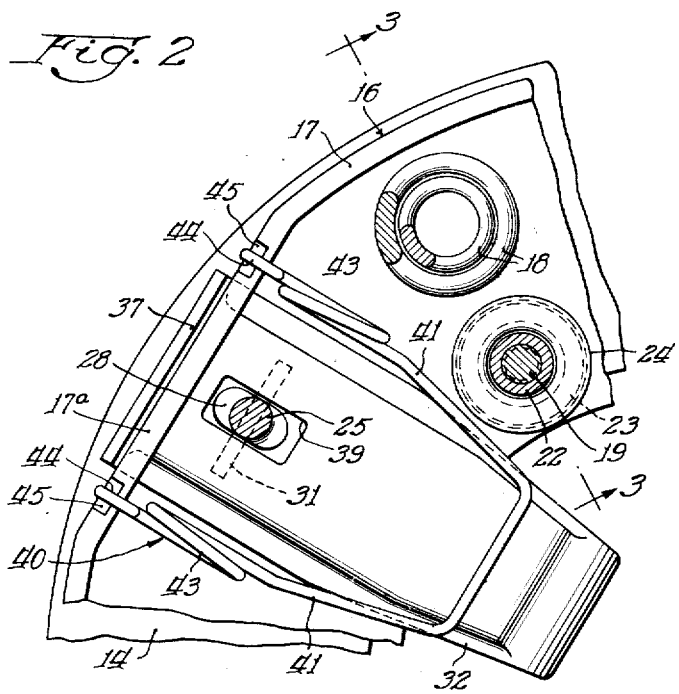
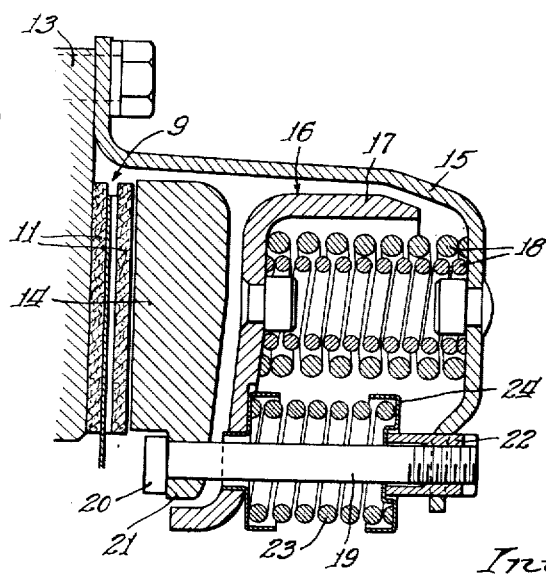
Inventor:
Harold Nutt and
Leo W. Cook

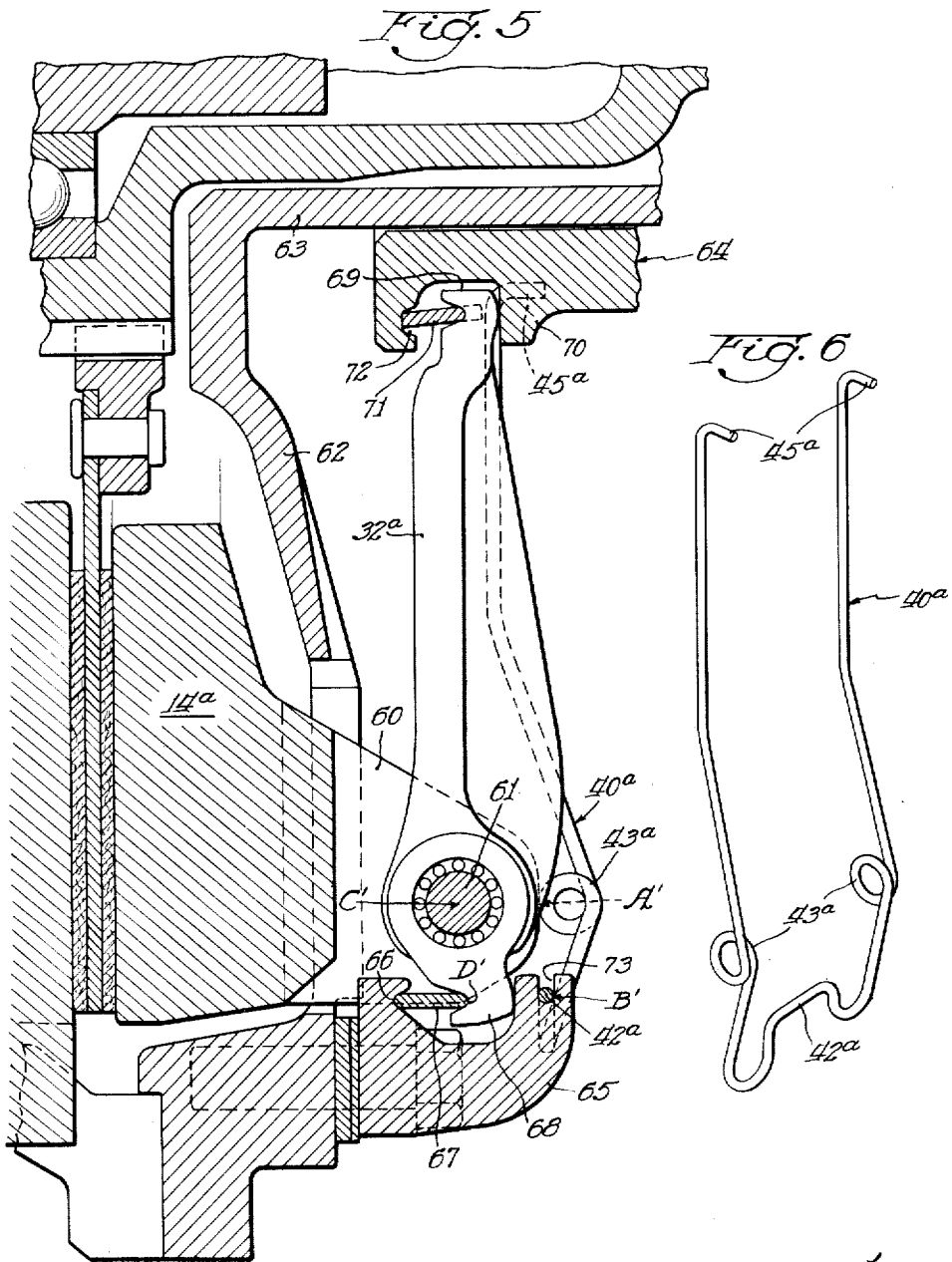

/ Patented Apr. 26, 1949

2,468,685

UNITED STATES PATENT OFFICE 2,468,685

ANTIRATTLER SPRING AND LEVER SYSTEM FOR CENTRIFUGAL CLUTCHES

Harold Nutt and Leo W. Cook, Chicago, Ill., assignors to Borg-Warner Corporation, Chicago, Ill., a corporation of Illinois Application October 30, 1944, Serial No. 561,009

9 Claims. (Cl. 192—99)

This invention relates to clutches such as used in motor driven vehicles, and more particularly to clutches of the friction type. Specifically, the present improvements are directed to the construction and arrangement of the control levers; the weights for centrifugally operating the clutch; and the reaction springs for the control levers.

It is one of the principal objects of this invention to simplify the construction of a clutch such as contemplated herein, and to improve the effiency and operation of such clutch.

Another principal object is to provide control lever arrangements wherein the lever has a plurality of fulcrums at least one of which includes an element that is adapted to bodily swing upon one edge during rocking of the lever.

A further principal object is to provide a plurality of fulcrums for a clutch control lever one of such fulcrums being located on the spring supporting member of the clutch, and the other fulcrums being on a support carried by the clutch cover.

Still another principal object hereof resides in the provision of a clutch control lever having a fulcrum comprised of a strut having a swinging teetering movement in an eye-bolt which supports and connects the spring supporting member of the clutch to the cover plate.

A still further object is to provide a spring member for a clutch control lever to prevent rattle or backlash, such spring member at its radially outer end bearing against the clutch spring ring and at its inner end against the control lever with an intermediate portion contacting the clutch cover. In this spring arrangement the two outer points of contact of the backlash spring are substantially in line with two corresponding outer fulcrums of the lever. Thus, the tension of the spring will not vary appreciably in different positions of the lever and there is no possibility of fatigue of the spring because it is not compressed beyond its initial tension during operation of the clutch.

Additional objects, aims, and advantages of the invention contemplated herein will be apparent to persons skilled in the art after the construction and operation of the clutch control is understood from the within description.

It is preferred to accomplish the numerous objects of this invention and to practice the same in substantially the manner hereinafter described and as more particularly pointed out in the claims, reference being made to the accompanying drawings that are a part of this specification, wherein:

Fig. 1 is a vertical axial sectional view of a centrifugal clutch showing an embodiment of the invention contemplated herein;

Fig. 2 is a fragmentary side elevation of a portion of the clutch shown in Fig. 1 with the cover plate omitted;

Fig. 3 is a sectional view along the plane of line 3—3 of Fig. 2;

Fig. 4 is a perspective view of the spring for the control lever;

Fig. 5 is a fragmentary view of modified arrangement of the control lever and spring; and Fig. 6 is a perspective view of the control lever spring for the modified arrangement.

The drawings are to be understood as being more or less of a schematic character for the purposes of disclosing typical or preferred forms of the improvements contemplated herein, and in these drawings like reference characters identify the same parts in the different views.

The particularly clutch disclosed in Figs. 1 and 2 comprises a clutch plate assembly 9 including a disc 10 having thereon the flat friction ring members 11, the disc 10 being carried on a rotatable hub 12 splined to driven shaft 8. The clutch plate assembly 9 is disposed between the adjacent face of flywheel 13 and the axially movable pressure member 14 of annular shape. A suitable cover plate 15 of dished cross-section has its rim anchored to the flywheel 13 on the drive shaft 7 and encloses the clutch and its actuating elements. A spring mounting member 16 of ring-like shape is arranged back of pressure member 14 and has a relatively wide peripheral flange 17 projecting toward the cover plate 15. Compressed thrust springs 18 are interposed between the mounting ring 16 and cover plate 15 tending to urge said ring in a direction away from the cover plate and toward the pressure member 14. Retractor bolts 19 pass through the cover plate 15 and spring mounting ring 16 with their headed inner ends 20 engaged in lugs 21 on the pressure plate 14 and having their threaded outer ends engaged by sleeve nuts 22 that are rotatably mounted in aligned apertures in cover plate 15. Compressed coiled springs 23 surround retractor bolts 19 between spring mounting ring 16 and suitable follower cups 24 that abut the inner ends of the nuts for retracting the pressure member 14 from the clutch plate.

The spring mounting ring 16 is movably connected to or carried by the cover plate 15 by means that permit axial movement of the mounting ring toward and from said cover plate. Said means comprise supports, preferably embodying eye-bolts 25 having their heads 26 anchored to the cover plate with their opposite ends slidably engaged in guide bushings 27 in the mounting ring 16. The eyes 28 of these bolts 25 have irregularly shaped internal walls of somewhat pear-shape, the apical recesses 29 of which are toward the mounting member 16 and the wider basal portions 30 are toward the bolt heads 26. This arrangement is adapted to accommodate the tilting movements of struts 31 that comprise flat compression links disposed with one of their longitudinal edges rockably seated in the apices 29 of the eyes 28 to effect swinging movement of their opposite edges.

Radially positioned release levers 32, which are fulcrumed for swinging or pivotal movement on struts 31, preferably comprise metal stampings having dished cross-sections for rigidity. These levers have transverse embossments near their outer ends that provide seats 33 on their inside surfaces in which adjacent edges of the struts 31 are engaged to fulcrum said levers for the desired rocking or swinging movement when the inner ends of the levers are moved by a shift collar 34 movable longitudinally of the driven shaft axis. Transverse channels 35 having crowns 36 extend across the outer regions of the levers beyond the struts 31 and these outer regions of the levers terminate in lateral lips 37 thus providing the levers with hook-shaped outer ends for engagement with the walls of apertures 38 in flatted regions 17a of the lateral rim 17 of spring mounting ring through which these lever ends project. The crowns 36 engaged with the adjacent walls of the apertures 38 effect a rolling line contact between the levers and the rims of the spring mounting ring. Suitable openings 39 are made in the levers to straddle the eye-bolts 25 that pass therethrough. It will be understood that the struts 31 are long enough to project out of the eyes 28 of the supporting bolts 25 so that the end regions of the struts will engage the seats 33 in the levers 32 on both sides of the openings 39 in said levers.

By reason of the arrangement just described the relatively deep channels 35 and lips 37 at the outer regions of the levers 32 constitute hook-shaped elements that function to restrict, to a closely limited degree, any radial movement of the levers toward or away from the axis of the clutch. Also a plurality of fulcrums are provided for each lever that are effective to accommodate pivotal or swinging movements of the lever. Each lever has a rolling fulcrum at its radially outer end on the rim of spring mounting ring 16, and intermediate its ends said lever has a movable fulcrum on the strut 31. The mid-region of the strut edge, which lies closest to the flywheel, fulcrums on the wall of the apical seat 29 in the eye-bolt. When a clutch lever 32 is moved toward the flywheel 13 to effect release of the clutch, a rolling action takes place between the outer or crowned fulcrum 31 and the wall of the hole 38. During this action the intermediate bearing 33 of the lever fulcrums on the edge of the strut that is farthest from the flywheel, and at the same time the strut itself will rock on its opposite edge in the seat 29 of the eye-bolt. In this arrangement the strut is located in the eye-bolt and there is a true rolling action at the fulcrums of the lever.

Suitable anti-rattler or backlash springs 40 are assembled with the levers 32 and the spring mounting ring plate. Each spring 40 is of substantially U-shape to straddle the lever and includes a pair of spaced arms 41 connected by a cross piece 42 and there are coils 43 at the outer portions of the arms terminating with reversely bent hooks 44 at their extremities. The hooks 44 of said springs are engaged in notches 45 at the edge of the spring ring rim 17, and the cross pieces 42 at the inner ends of said springs extend across inner portions of the levers 32, while the intermediate portions or coils 43 are engaged with inwardly pressed bosses 46 in adjacent regions of the cover 15. It will thus be seen that the two outer contact points A and B of the springs 40 are substantially in line with the corresponding fulcrum points C and D of the levers 32. This is quite effective since the springs may be compressed any amount for suitable tension while assembling the structure, and thereafter the tension which keeps the slack out of the parts will not vary appreciably regardless of the relative positions of the levers. Furthermore, there is no possibility for fatigue of the springs because there is no material compression of them during operation of the clutch. The springs rock with the levers and there is very little change in the amount of stress in the coils. This is due to the fact that the intermediate fulcrums of the springs where they rest against bosses 46 on the cover are so located with relation to the inner and outer ends of the levers that the rocking of the levers also rocks the springs without changing to any considerable extent the amount of wind or tension of the coils. By reason of the arrangement the backlash spring does not in any way affect the thrust spring load of the clutch.

The engagement of the clutch may be accomplished centrifugally through the outward swing of weights 47 having L-shaped legs 48 extending through slots 49 in the spring mounting ring 16. The lateral members 50 of legs 48 provide foot elements interposed between the spring mounting ring 16 and pressure plate 14 so that the toe and heel portions 50a and 50b engage in recesses 51 in the adjacent face of said pressure plate that are arranged inwardly from lugs 52 on said pressure plate. The lugs 52 project into the slots 49 to operatively connect the spring mounting ring 16 and the pressure plate for simultaneous rotative movement but will permit relative axial movement between these elements toward or away from each other. Radially inward of the slots 49 there are laterally embossed portions in the spring mounting ring 16 to provide seats 53 for adjacent edges of struts 54. The opposite edges of these struts 54 are engaged in seats 55 on the feet 50. The heels 50b constitute fulcrums for the weights 47 and when these weights swing outward in response to centrifugal force the toes 50a will act on the struts 54 to move the spring mounting ring and pressure plate apart. Thus, the pressure plate will move to the left (Fig. 1) until it engages the clutch plate assembly 9 which will move into engagement with the rotating flywheel, and after a firm contact has been made between these elements the weights will continue to move the spring mounting ring 16 a desirable distance to the right compressing the thrust springs 18 so that the weights may move to the full outermost positions against the spring mounting ring 16. This arrangement prevents overloading of the parts because the extreme pressures developed at high rotational speeds are restrained by the spring mounting ring and are not carried through the legs 48 of the weights to pressure plate 14 and struts 54. It is desirable to provide some over-travel of the weights to compensate for wear on the facings or friction ring members 11 of the clutch plate so that adequate pressure will continue to be developed on said friction members as wear progresses. This is effectively taken care of by the present structure.

The central or full-line position of control lever 32 is the position to which this lever is pushed from its right-hand dotted position to prepare the clutch for automatic centrifugal engagement. Lever 32 is restrained in this central position by the usual clutch control linkage (not shown) which holds the release collar 34 against the levers 32 so that they cannot move far to the right. In this position, with the engine idling, pressure plate 14 is clear of the clutch plate 9 so that the clutch is released. When the control lever 32 is moved to the left toward the flywheel 13, by operating the clutch foot pedal, the clutch is manually released sufficiently to entirely overcome the action of centrifugal force on the pressure plate 14. This permits the clutch to be manually released at any time regardless of the engine speed. The movement of control lever 32 to its left-hand position (Fig. 1) will move the spring mounting ring 16 to the right thus compressing springs 18 and moving the spring ring and pressure plate assembly away from the fly-wheel and clutch driven plate. The release levers 32 act directly on the spring ring and move the entire assembly, including said ring, the weights 47 and the pressure plate 14 as a unit away from or toward the clutch driven member.

In the modified structure shown in Fig. 5, the pressure plate 14a has lateral ears 60 carrying pivot pins 61 that provide fulcrums for the outer regions of the central levers 32a. The cover 62 has a hub portion 63 on which the shift sleeve or collar assembly 64 slides in an axial direction, and the marginal portion of the cover has recessed brackets 65 that are radially outward from the lever fulcrums 61. Notches 66 are made in the walls of the bracket recesses to receive adjacent edges of compression links or struts 67 and the opposite edges of these struts are engaged by hook-shaped outer end regions 68 of the levers 32a. The hooked inner ends 69 of the control levers enter radial U-shaped bosses or circumferential flanges 70 on shift sleeve 64 where they fulcrum on adjacent edges of struts 71, the opposite edges of said struts being engaged in grooves 72 in the opposite walls of recessed bosses 70. Anti-rattler or backlash springs 40a ride at their hooked inner ends 45a on the shift collar or sleeve 64 and have their outer ends that comprise arched cross members 42a seated in slots 73 in the cover brackets 65 in line with the struts 61. The intermediate regions of the spring arms are formed with coils 43a which bear against the pivotal bosses of the levers in line with the fulcrum pins 61 as shown in Fig. 5. In this modified arrangement, the two outer contact points A' and B' of the springs 40a are substantially in line with the corresponding fulcrum points C' and D' of the control levers 32a, and the tension of these springs after assembly will not vary appreciably during operation of the control levers 32a.

While we have described our invention in connection with one specific embodiment thereof, it is to be understood that this is by way of illustration and not by way of limitation and the scope of our invention is defined solely by the appended claims which should be construed as broadly as the prior art will permit.

We claim:

1. In a friction clutch a spring supporting ring; a cover; a supporting member on said cover; a clutch operating lever fulcrumed on said member; and a spring bearing at its inner end on said lever and at its outer end on said ring, an intermediate portion of said spring being fulcrumed on said cover.

2. In a friction clutch a pressure plate; a radially positioned lever for operating said plate, said lever having spaced fulcrums at its outer portion; and yieldable anti-rattler means for said lever, said means having spaced fulcrums arranged substantially in line with the respective fulcrums of said lever.

3. In a friction clutch a pressure plate; a radially positioned lever for operating said plate, said means providing radially spaced fulcrums for the outer portion of said lever; and an anti-rattler spring for said lever, said spring having radially spaced fulcrums arranged substantially in line with the respective fulcrums of said lever.

4. In a friction clutch a pressure plate; a cover member; a radial lever for operating said plate; radially spaced fulcrums for said lever, at least one of said fulcrums supported by said cover member; and an anti-rattler spring for said lever, said spring having radially spaced fulcrums at least one of which is on said cover member in line with a fulcrum of said lever.

5. In a friction clutch a pressure plate; a member alongside said plate; a radial lever for operating said plate; a strut operatively supported by said member providing a fulcrum for the outer portion of said lever; means providing a second fulcrum for said lever spaced in a radial direction from said strut; and anti-rattler means for said lever comprising a spring having radially spaced fulcrums, one of said fulcrums being in line with said strut and another of which is in line with another fulcrum of said lever.

6. In a friction clutch a pressure plate; a cover; a clutch release lever; a supporting member on said cover having an eye; a strut operating in said eye providing a fulcrum for said lever; means spaced from said strut providing a second fulcrum for said lever; and anti-rattler means for said lever comprising a spring having a fulcrum on said cover in line with said strut, said spring having a second fulcrum in line with the second fulcrum of said lever.

7. In a friction clutch a pressure plate; a cover; a clutch spring supporting ring; a member on said cover for supporting said ring; a lever for operating said pressure plate having a fulcrum on said member; a crowned recess at the outer region of said lever engaged with the rim of said ring for providing a second fulcrum for said lever; and anti-rattler means for said lever comprising a spring having a fulcrum on said cover in line with the first named fulcrum of said lever, the outer portion of said spring being engaged with the ring rim in line with the crowned recess of said lever.

8. In a friction clutch, a pressure plate; a cover; a supporting bolt on said cover having an eye; a lever for operating said pressure plate; and a flat member of less width than and extending diametrically across said eye, one edge of said member having rolling engagement with a wall of said eye and the opposite edge of said member having rolling engagement with said lever, said member thereby providing two spaced axes of rotational movement for said lever.

9. In a friction clutch a pressure plate; a radially arranged lever for operating said plate having radially spaced fulcrums at its outer region; and radially arranged anti-rattler means for said lever, said means having radially spaced fulcrums each of which is approximately in axial alignment with a fulcrum of said lever.

HAROLD NUTT.
LEO W. COOK.

REFERENCES CITED

The following references are of record in the file of this patent:

UNITED STATES PATENTS

| Number | Name | Date |
|---|---|---|
| 534,499 | Dodge | Feb. 19, 1895 |
| 1,493,166 | Scofield | May 6, 1924 |
| 1,907,008 | Rockwell | May 2, 1933 |
| 1,959,036 | Nutt | May 15, 1934 |
| 2,038,017 | Wemp | Apr. 21, 1936 |
| 2,062,102 | Nutt et al. | Nov. 24, 1936 |
| 2,115,277 | Nutt et al. | Apr. 26, 1938 |
| 2,250,394 | Reed | July 22, 1941 |
| 2,251,349 | Anderson | Aug. 5, 1941 |
| 2,366,643 | Nutt | Jan. 2, 1945 |

FOREIGN PATENTS

| Number | Country | Date |
|---|---|---|
| 419,834 | Great Britain | July 1, 1933 |